Patented June 10, 1952

2,600,077

UNITED STATES PATENT OFFICE 2,600,077

THIOSEMICARBAZONES

Hans Schmidt, Wuppertal-Vohwinkel, and Robert Behnisch and Fritz Mietzsch, Wuppertal-Elberfeld, Germany, assignors to Schenley Laboratories, Inc., New York, N. Y., a corporation of Delaware No Drawing. Application November 17, 1949, Serial No. 128,023. In Germany October 5, 1948

14 Claims. (Cl. 260—552)

This invention relates to thiosemicarbazones and more particularly to thiosemicarbazones derived from phthalaldehyde.

It is an object of the invention to provide a novel class of thiosemicarbazones which possess good antibacterial activity, especially against tubercle bacilli.

The object is accomplished by the provision of phthalaldehyde thiosemicarbazones, which are obtained by the reaction of phthalaldehydes with thiosemicarbazide.

This applies to the monothiosemicarbazones as well as to the dithiosemicarbazones. The reaction can be produced in such a way that either monothiosemicarbazones or dithiosemicarbazones are principally formed. In the first instance, the components are preferably used in the molar ratio 1:1, the thiosemicarbazide solution is gradually added to the phthalaldehyde, unnecessarily long heating being avoided. If dithiosemicarbazones are to be obtained two or preferably more than two mols of thiosemicarbazide are used. In both cases smaller admixtures of mono- or di-compounds respectively can be removed by treatment with suitable solvents.

The invention is further illustrated by the following examples without being restricted thereto:

Example 1

27 grams of terephthalaldehyde are dissolved in 200 ccs. of hot water and a hot solution of 36 grams of thiosemicarbazide in 250 ccs. of water are added thereto. A dense precipitation immediately takes place. After completion of the reaction, sucking off and drying, terephthalaldehyde-di-thiosemicarbazone is obtained as weakly yellowish powder in a good yield. It does not melt below 340° C. The reaction product is insoluble in the usual solvents. It dissolves in caustic soda solution with yellow color.

The composition of the reaction product is:

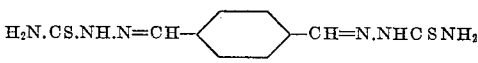

Example 2

27 grams of terephthalaldehyde in 750 ccs. of alcohol are refluxed and a hot solution of 18 grams of thiosemicarbazide in 250 ccs. of water is added thereto in small portions. Towards the end of this step precipitation starts. Prolonged heating is inadvisable to avoid the formation of dithiosemicarbazone by rearrangement. The hot solution is sucked off from the undissolved part. The undissolved compound proved to be the dithiosemicarbazone described in Example 1 which is here formed as by-product.

On cooling yellow, bright crystals precipitate from the filtrate in an abundant quantity. The crystals can be recrystallized from dilute alcohol or from butanol. They are soluble in caustic soda solution with yellow color. The melting point is about 215° C. with decomposition. According to the analysis the reaction product is the monothiosemicarbazone of terephthalaldehyde of the following composition:

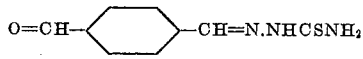

Example 3

27 grams of isophthalaldehyde are dissolved in 750 ccs. of hot alcohol and a hot solution of 36 grams of thiosemicarbazide in 600 ccs. of water and some drops of glacial acetic acid are added thereto. After some minutes an almost colorless precipitation begins which rapidly increases. The solution is left on the water-bath for some time, then cooled and sucked off. The dithiosemicarbazone of isophthalaldehyde of the composition:

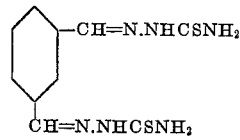

is thus obtained in a good yield. For purifying the substance is boiled with alcohol. The reaction product melts at about 247° C. with decomposition and strong evolution of gas.

The monothiosemicarbazone of isophthalaldehyde can be obtained by working in a similar manner as described for terephthalaldehyde in Example 2. The mono- and dithiosemicarbazone of o-phthalaldehyde can also be obtained in an analogous manner.

In the following claims, the term phthalal refers to o-diformylbenzene merely, not to the m- and p-isomers thereof.

We claim:
1. Phthalal-monothiosemicarbazone.
2. A thiosemicarbazone of di-(formyl)-benzene.
3. A monothiosemicarbazone of di-(formyl)-benzene.
4. Terephthalal-monothiosemicarbazone.
5. Isophthalal-monothiosemicarbazone.
6. Phthalal-di(thiosemicarbazone).
7. Terephthalal-di(thiosemicarbazone).
8. Process for making thiosemicarbazones of di-(formyl)-benzene that comprises slowly adding an aqueous solution of thiosemicarbazide to a refluxing solution of di-(formyl)-benzene in a lower aliphatic alcohol, and recovering the thiosemicarbazone from the reaction mixture.

9. Process as defined in claim 8 wherein the di-(formyl)-benzene is phthalal and the molecular ratio of the selected di-(formyl)-benzene to the thiosemicarbazide is 1:1.

10. Process as defined in claim 8 wherein the di-(formyl)-benzene is phthalal and the molecular ratio of the selected di-(formyl)-benzene to the thiosemicarbazide is 1:2.

11. Process as defined in claim 8 wherein the di-(formyl)-benzene is terephthalal and the molecular ratio of the selected di-(formyl)-benzene to the thiosemicarbazide is 1:1.

12. Process as defined in claim 8 wherein the di-(formyl)-benzene is terephthalal and the molecular ratio of the selected di-(formyl)-benzene to the thiosemicarbazide is 1:2.

13. Process as defined in claim 8 wherein the di-(formyl)-benzene is isophthalal and the molecular ratio of the selected di-(formyl)-benzene to the thiosemicarbazide is 1:1.

14. A dithiosemicarbazone of di-(formyl)-benzene.

HANS SCHMIDT.
ROBERT BEHNISCH.
FRITZ MIETZSCH.

REFERENCES CITED

The following references are of record in the file of this patent:

Sacks et al., "Ber. deut. chem.," vol. 39 (1906), page 2167.

Domagk, "Naturwissenschaften," vol. 33, Nov. 30, 1946, page 315.

Moncorps et al., "Medizinische Klinik," vol. 42. Nov. 15, 1947, page 812.

Domagk, "Zentralblatt fur Gynakologie." vol 69 (1947), page 837.